United States Patent
Deng et al.

(10) Patent No.: US 7,617,104 B2
(45) Date of Patent: Nov. 10, 2009

(54) METHOD OF SPEECH RECOGNITION USING HIDDEN TRAJECTORY HIDDEN MARKOV MODELS

(75) Inventors: Li Deng, Redmond, WA (US); Jian-Iai Zhou, Beijing (CN); Frank Torsten Bernd Seide, Beijing (CN)

(73) Assignee: Microsoft Corporation, Redmond, WA (US)

( * ) Notice: Subject to any disclaimer, the term of this patent is extended or adjusted under 35 U.S.C. 154(b) by 881 days.

(21) Appl. No.: 10/348,192

(22) Filed: Jan. 21, 2003

(65) Prior Publication Data

US 2004/0143435 A1 Jul. 22, 2004

(51) Int. Cl.
 *G10L 15/14* (2006.01)
(52) U.S. Cl. .................................. 704/256.5
(58) Field of Classification Search ................. 704/255, 704/256, 256.1, 256.5
See application file for complete search history.

(56) References Cited

U.S. PATENT DOCUMENTS 5,806,029 A * 9/1998 Buhrke et al. ............... 704/244
5,893,058 A * 4/1999 Kosaka ....................... 704/254
2001/0044719 A1 * 11/2001 Casey ......................... 704/245

OTHER PUBLICATIONS

Ma, J. et al., "A mixture Linear Model With Target-Directed Dynamics For Spontaneous Speech Recognition," 2002 IEEE International Conference on Acoustics, Speech and Signal Processing, Orlando, FL, May 13-17, 2002 pp. I-961-4 vol. 1.

Picone, J. et al., "Initial Evaluation of Hidden Dynamic Models on Conversational Speech," 1999 IEEE International Conference on Acoustics, Speech and Signal ICASSP99, Phoenix, AZ, vol. 1, pp. 15-19.

Richards, H.B. et al., "The HDM: A Segmental Hidden Dynamic Model of Coarticulation," 1999 IEEE International Conference on Acoustics, Speech and Signal Processing, ICASSP99, Phoenix, AZ, vol. 1, pp. 357-360.

European Search Report for corresponding EPO Patent Application 04001079.5.

H.G. Hirsch and D. Pearce, "The AURORA Experimental Framework for the Performance Evaluations of Speech Recognition Systems Under Noisy Conditions," ISCA ITRW ASR2000, Automatic Speech Recognition: Challenges for the Next Millennium (Sep. 2000).

(Continued)

*Primary Examiner*—Angela A Armstrong
(74) *Attorney, Agent, or Firm*—Theodore M. Magee; Westman, Champlin & Kelly, P.A.

(57) ABSTRACT

A method of speech recognition is provided that determines a production-related value, vocal-tract resonance frequencies in particular, for a state at a particular frame based on the production-related values associated with two preceding frames using a recursion. The production-related value is used to determine a probability distribution of the observed feature vector for the state. A probability for an observed value received for the frame is then determined from the probability distribution. Under one embodiment, the production-related value is determined using a noise-free recursive definition for the value. Use of the recursion substantially improves the decoding speed. When the decoding algorithm is applied to training data with known phonetic transcripts, forced alignment is created which improves the phone segmentation obtained from the prior art.

21 Claims, 5 Drawing Sheets

OTHER PUBLICATIONS

Li Deng et al., "Large Vocabulary Continuous Speech Recognition Under Adverse Conditions," In Proceedings of the ICSLP, vol. 3, pp. 806-809 (Oct. 2000).

Li Deng et al., "High-Performance Robust Speech Recognition Using Stereo Training Data," In International Conference on Acoustics, Speech and Signal Processing (May 2001).

Jasha Droppo et al., "Efficient On-Line Acoustic Environment Estimation for FCDCN in A Continuous Speech Recognition System," In International Conference on Acoustics, Speech and Signal Processing (May 2001).

P. Moreno, "Speech Recognition in Noisy Environments," Ph.D. Thesis, Carnegie Mellong University (1996).

Brendan Frey, et al., "ALGONQUIN: Iteratin Laplace's Method to Remove Multiple Types of Noise and Channel Distortion from Log-Spectra in Robust Speech Recognition," (2001).

A. Acero, et al., "HMM Adaptation Using Vector Taylor Series for Noisy Speech Recognition," Proceedings ICSLP, vol. 2, pp. 869-872 (2000).

M. Afify and O. Siohan, "Sequential Noise Estimation With Optimal Forgetting for Robust Speech Recognition," Proceedings ICASSP, vol. 1, pp. 229-232 (2001).

N. S. Kim, "Nonstationary Environment Compensation Based on Sequential Estimation," IEEE Signal Processing Letters, vol. 5, pp. 57-60 (1998).

V. Krishnamurthy and J.B. Moore, "On-Line Estimation of Hidden Markov Model Parameters Based on the Kullback-Leibler Information Meature," IEEE Transaction Signal Processing, vol. 41, pp. 2557-2573 (1993).

P. Moreno et al., "A Vector Taylor Series Approach for Environment-Independent Speech Recognition," Proceedings ICASSP, vol. 1, pp. 733-736 (1996).

First Office Action in counterpart Chinese application 200410005917.7, filed Jan. 21, 2004.

Examination report for European Patent Application No. 04001079.5 filed on Jan. 20, 2004.

* cited by examiner

METHOD OF SPEECH RECOGNITION USING HIDDEN TRAJECTORY HIDDEN MARKOV MODELS

BACKGROUND OF THE INVENTION

The present invention relates to pattern recognition. In particular, the present invention relates to speech recognition.

A pattern recognition system, such as a speech recognition system, takes an input signal and attempts to decode the signal to find a pattern represented by the signal. For example, in a speech recognition system, a speech signal (often referred to as a test signal) is received by the recognition system and is decoded to identify a string of words represented by the speech signal.

Many speech recognition systems utilize Hidden Markov Models in which phonetic units, which are also referred to as acoustic units or speech units, are represented by a single tier of connected states. Using a training signal, probability distributions for occupying the states and for transitioning between states are determined for each of the phonetic units. To decode a speech signal, the signal is divided into frames and each frame is transformed into a feature vector. The feature vectors are then compared to the distributions for the states to identify a most likely sequence of HMM states that can be represented by the frames. The phonetic unit that corresponds to that sequence is then selected.

Although HMM-based recognition systems perform well in many relatively simple speech recognition tasks, they do not model some important dynamic aspects of speech directly (and are known to perform poorly for difficult tasks such as conversational speech). As a result, they are not able to accommodate dynamic articulation differences between the speech signals used for training and the speech signal being decoded. For example, in casual speaking settings, speakers tend to hypo-articulate, or under articulate their speech. This means that the trajectory of the user's speech articulation may not reach its intended target before it is redirected to a next target. Because the training signals are typically formed using a "reading" style of speech in which the speaker provides more fully articulated speech material than in hypo-articulated speech, the hypo-articulated speech does not match the trained HMM states. As a result, the recognizer provides less than ideal recognition results for casual speech.

A similar problem occurs with hyper-articulated speech. In hyper-articulated speech, the speaker exerts an extra effort to make the different sounds of their speech distinguishable. This extra effort can include changing the sounds of certain phonetic units so that they are more distinguishable from similar sounding phonetic units, holding the sounds of certain phonetic units longer, or transitioning between sounds more abruptly so that each sound is perceived as being distinct from its neighbors. Each of these mechanisms makes it more difficult to recognize the speech using an HMM system because each technique results in a set of feature vectors for the speech signal that often do not match well to the feature vectors present in the training data. Even if the feature vectors corresponding to the hyper- or hypo-articulated speech match those in the training data (which may be very expensive to obtain), the conventional HMM technique will still perform poorly because of the increased phonetic confusability for the HMM system that does not take into account the underlying causes of the changes in the feature vector trajectories induced by hyper- or hypo-articulation.

HMM systems also have trouble dealing with changes in the rate at which people speak. Thus, if someone speaks slower or faster than the training signal, the HMM system will tend to make more errors decoding the speech signal.

Alternatives to HMM systems have been proposed. In particular, it has been proposed that the trajectory or behavior of a production-related parameter of the speech signal should be modeled directly. However, these models have not provided efficient means for decoding based on the trajectory.

In light of this, a speech recognition framework is needed that allows for faster decoding while taking into account changes of speech feature trajectories caused by speech production mechanisms due to a variety of speaking styles.

SUMMARY OF THE INVENTION

A method of speech recognition is provided that determines a production-related value, vocal tract resonance frequencies in particular, for a state at a particular frame based on a production-related value determined for a preceding frame. The production-related value is used to determine a probability distribution for the state. A probability for an observed value received for the frame is then determined from the probability distribution. Under one embodiment, the production-related value is determined using a noise-free recursive definition for the value. Use of the recursion substantially improves the decoding speed over the prior art.

In some aspects of the invention, a combined Hidden Trajectory and Hidden Markov Model is used to decode training acoustic data, which have known phonetic transcriptions or HMM state sequences, and thereby produce an alignment between the training data and a set of states. This forced alignment improves the phone segmentation, which is then used to train the combined model in an iterative manner.

Under further aspects of the invention, a production-related value is calculated based on one of a plurality of targets where all of the targets in the plurality are trained simultaneously.

DETAILED DESCRIPTION OF ILLUSTRATIVE EMBODIMENTS

Figure 1:
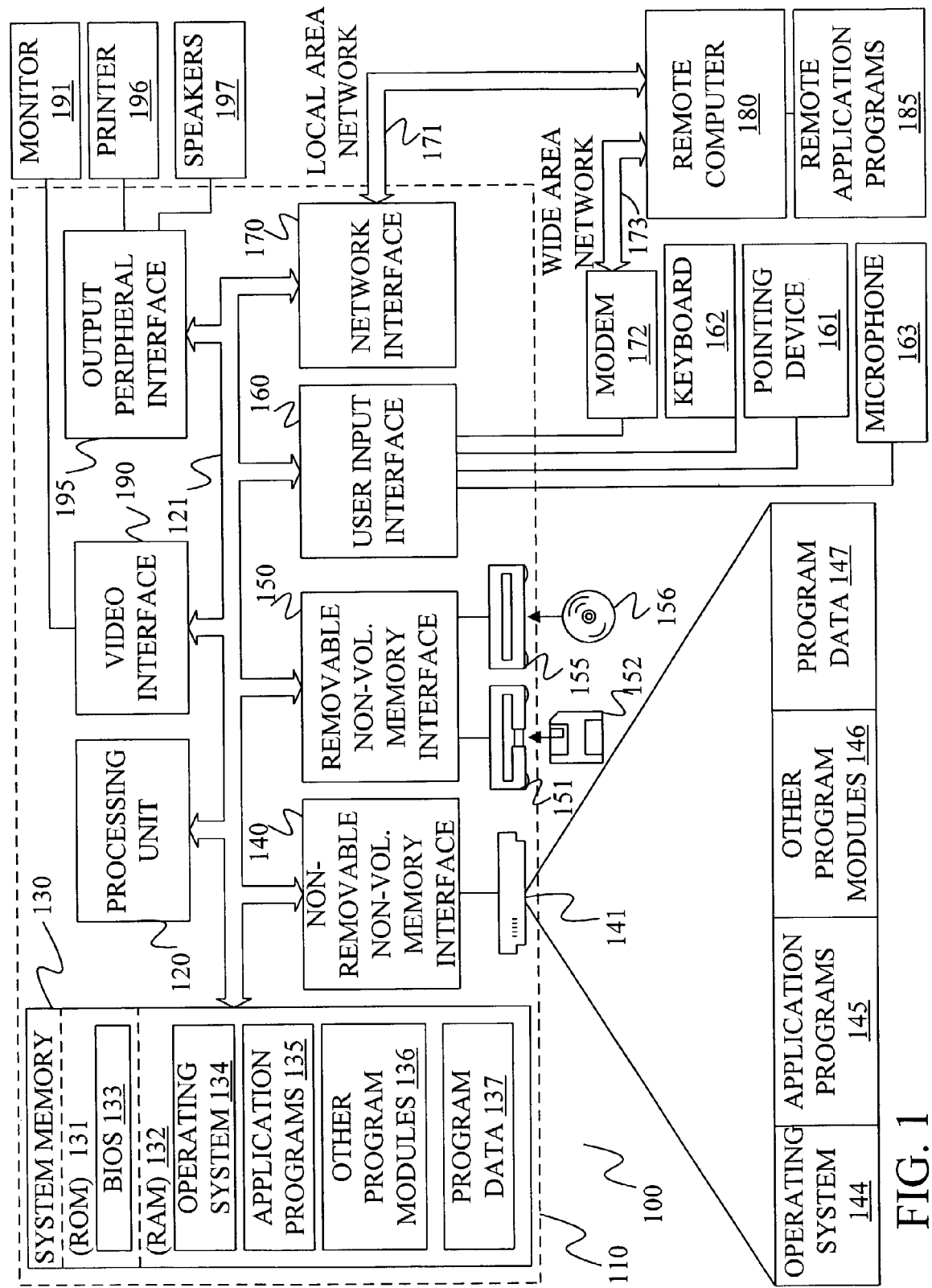
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
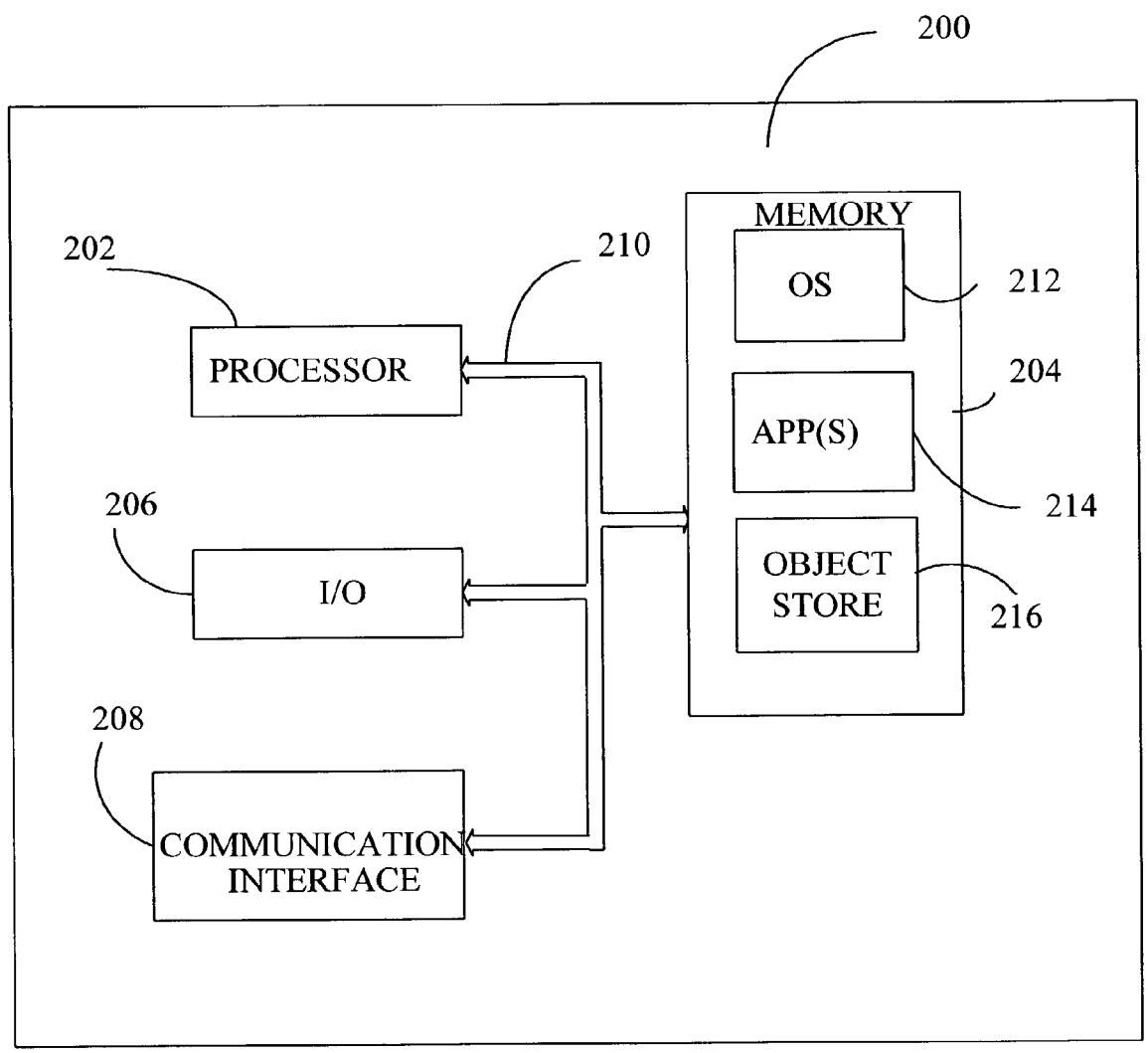
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

The present invention provides a generative model of speech. Under this model, speech is represented as the output of an attempt by the speaker to phonetically implement a linguistic definition of a sequence of phonological units. During this attempt, the speaker produces a production-related value that follows a trajectory toward a target associated with a current phonological unit. Under embodiments of the present invention, this trajectory is modeled as a noise-free, second-order, discrete-time critically-damped, low-pass filter with unity gain.

The model of the present invention is a special form of a Hidden Trajectory Model. This hidden trajectory model includes two layers, a dynamic or trajectory model component that describes hidden production-related parameters (such as vocal tract resonance frequencies), and a mapping model component that translates the production-related parameters into observable acoustic features such as Mel-Frequency Cepstral Coefficients. The trajectory model predicts a sequence of trajectory values $(z(1), \ldots, z(t), \ldots, z(T))$ for a production-related parameter. The mapping model predicts a sequence of acoustic observation vectors $o(t)$ given the sequence of trajectory values.

The trajectory and mapping models can be succinctly represented by the two equations:

$$z(t) = g^{u(1 \cdots t)}(t) + w(t) \qquad \text{Eq.1}$$

$$o(t) = h^{u(t)}(z(t)) + v(t) \qquad \text{Eq.2}$$

with $g^{u(1 \cdots t)}(t)$ being the state-dependent expected trajectory (hereinafter referred to as $g(t)$ for simplicity), $z(t)$ being the hidden true trajectory, $u(t)$ being a discrete speech state or speech unit at frame $t$, $u(1 \ldots t)$ is a sequence of discrete speech states or speech units from time 1 to time $t$, and $h^{u(t)}$ being a state-dependent mapping function to map the production-related parameters to the feature space. In practice, each speech unit $u$ is broken down into a few HMM-like smaller units (denoted by $s$ as in some of the following equations) sequentially connected from left to right.

The summands $w(t)$ and $v(t)$ denote i.i.d. Gaussian noise with zero mean and covariance matrices $Q = C_{ww}$ and $R = C_{vv}$, respectively, that model the deviation of the actual observation from the expected values. I.e.:

$$p(z(t)|g^{u(t)}(t)) = N(z(t); g^{u(t)}(t), Q) \qquad \text{Eq.3}$$

$$p(o(t)|z(t), s(t)) = N(o(t); h^{u(t)}(z(t)), R) \qquad \text{Eq.4}$$

Under the invention, the trajectory at any time $t$ is calculated using a recursive, noise-free function defined as:

$$g(t) = 2\gamma_{u(t)} g(t-1) - \gamma_{u(t)}^2 g(t-2) + (1 - \gamma_{u(t)})^2 T_{u(t)} \qquad \text{Eq.5}$$

where $T_{u(t)}$ is the target for the trajectory of speech unit $u$ at time $t$, $\gamma_{u(t)}$ is a time constant associated with speech unit $u$, $g(t-1)$ is the value of the trajectory at the preceding frame and $g(t-2)$ is the value of the trajectory at the second preceding frame. Note that $g(t-1)$ and $g(t-2)$ could be computed using different values of $\gamma_{u(t)}$ and $T_{u(t)}$ because they may have been calculated for a different speech unit $u$.

Note that the recursive calculation of Equation 5 does not include a noise term. By eliminating the noise term, the present invention simplifies training and decoding.

Equation 5 can be rewritten in a canonical form as:

$$G(t) = \Phi_{u(t)} G(t-1) + V_{u(t)} \qquad \text{Eq.6}$$

where:

$$\Phi_{u(t)} = \begin{bmatrix} 2\gamma_{u(t)} & -\gamma_{u(t)}^2 \\ 1 & 0 \end{bmatrix} \qquad \text{Eq. 7}$$

-continued $$G(t) = \begin{bmatrix} g(t) \\ g(t-1) \end{bmatrix} \quad \text{Eq. 8}$$

$$G(t-1) = \begin{bmatrix} g(t-1) \\ g(t-2) \end{bmatrix} \quad \text{Eq. 9}$$

$$V_{u(t)} = (1 - \gamma_{u(t)})^2 \begin{bmatrix} T_{u(t)} \\ 0 \end{bmatrix} \quad \text{Eq. 10}$$

Under one embodiment of the present invention, the state-dependent mapping function $h^{s(t)}$ used to map the production-related trajectory onto acoustic features is a Taylor series of the form:

$$h^{s(t)}(z(t)) = \bar{\mu}_{m,s} + H_{m,s} \cdot (z(t) - \bar{z}_{m,s}) + \text{residual}(z(t) - \bar{z}_{m,s}) \quad \text{EQ. 11}$$

where m is a mixture index, and $\bar{z}_{m,s}$ is the expected trajectory value. Under one embodiment, $\bar{\mu}_{m,s}$ is initially set equal to the mean for mixture m of a context-independent Hidden Markov Model (HMM) state and s is the HMM state. Thus, this embodiment provides a combined Hidden Trajectory and Hidden Markov Model.

Under one aspect of the present invention, the predicted vectors for silence and noise phones are formed by assuming that $H_{m,s}=0$. As a result, the predicted feature vectors for silence and noise are not dependent on the trajectory of the production-related value. This is consistent with the generative model where silence and noise represent an interruption in speech generation.

Using this mapping function and combining the residual and noise terms, Equations 2 and 4 become:

$$o(t) = \bar{\mu}_{m,s} + H_{m,s} \cdot (z(t) - \bar{z}_{m,s}) + v'(t) \quad \text{Eq. 12}$$

$$p(o(t)|z(t), s, m) = N(o(t); \bar{\mu}_{m,s} + H_{m,s}(z(t) - \bar{z}_{m,s}), R_{m,s}) \quad \text{Eq. 13}$$

The model parameters $T_{u(t)}$, $\gamma_{u(t)}$, $H_{m,s}$, $\bar{\mu}_{m,s}$, $\bar{z}_{m,s}$, Q, $R_{m,s}$, are trained using an Expectation-Maximization training algorithm where $\bar{\mu}_{m,s}$ is arbitrarily chosen to coincide with the HMM mean estimate. The algorithm includes an E-step in which a set of training observation vectors are used with an initial estimate of the model parameters to develop sufficient statistics to predict the value of certain hidden variables including mixture weights, the trajectory, and the square of the trajectory.

To perform the first iteration of the E-step, initial estimates of the model parameters must be provided. Under one embodiment, initial estimates for $T_{u(t)}$ and $\gamma_{u(t)}$ are selected using combined knowledge of the Klatt speech synthesizer and some spectrogram analysis results. In addition, under one embodiment of the invention, the set of training data that will be used to train the model is first applied to an existing Hidden Markov Model to identify an alignment between the states of the Hidden Markov Model and the frames of the training data.

Using the targets $T_{u(t)}$, the time constants $\gamma_{u(t)}$, and alignment boundaries set by the HMM model, a set of trajectories g(t) is estimated using Equation 5 above. The means of the HMM states in the previously trained HMM are used as the initial estimates of $\bar{\mu}_{m,s}$.

Assuming that the noise w(t) in the determination of each trajectory is zero and randomly assigning observation vectors to mixtures, $H_{m,s}$ and $\bar{z}_{m,s}$, are estimated for each mixture of each state to minimize the sum of the squared error between the observed feature vectors o(t) and the calculated feature vectors, where the error is computed as:

$$v(t) = o(t) - (\bar{\mu}_{m,s} + H_{m,s} \cdot (g(t) - \bar{z}_{m,s})) \quad \text{Eq. 14}$$

Once $H_{m,s}$ and $\bar{z}_{m,s}$ have been determined for each mixture and each state, the covariance matrix $R_{m,s}$ can be estimated for each mixture in each state as:

$$R_{m,s} = E\{vv^{trans}\} \quad \text{Eq. 15}$$

$$= \frac{1}{T} \sum_t v(t) \cdot v(t)^{trans}$$

$$= \frac{1}{T} \sum_t (o(t) - (\bar{\mu}_{m,s} + H_{m,s}(g(t) - \bar{z}_{m,s})) \cdot$$

$$(o(t) - (\bar{\mu}_{m,s} + H_{m,s}(g(t) - \bar{z}_{m,s}))^{trans}$$

The estimate of Q is determined by first estimating the noise w(t) in the determination of the trajectory g(t) such that the observation noise v(t) is minimized. This results in:

$$w(t) = (H_{m,s}^{trans} H_{m,s})^{-1} H_{m,s}^{trans} \cdot (o(t) - (\bar{\mu}_{m,s} + H_{m,s}(g(t) - \bar{z}_{m,s}))) \quad \text{Eq. 16}$$

Q is then initialized as:

$$Q = E\{ww^{trans}\} \quad \text{Eq. 17}$$

$$= \frac{1}{T} \sum_t w(t) \cdot w(t)^{trans}$$

Under one embodiment, $R_{m,s}$ and Q are assumed to be diagonal matrices so only the diagonals of the matrices are calculated.

After initialization, the E step involves the following calculations:

$$\omega_{m,s}(t) = P(m|o(t)) = \frac{p(o(t)|m)P(m)}{\sum_{m'=1}^{M} p(o(t)|m')P(m')} \quad \text{EQ. 18}$$

$$p(o(t)|m) = N(o(t); \bar{\mu}_{m,s} + H_{m,s}(g(t) - \bar{z}_{m,s}), S_{m,s}) \quad \text{EQ. 19}$$

$$E[z_t] = [H_{m,s}^{TRANS} R_{m,s}^{-1} H_{m,s} + Q^{-1}]^{-1} [H_{m,s}^{TRANS} R_{m,s}^{-1} (o(t) - \bar{\mu}_{m,s} + H_{m,s} \bar{z}_{m,s}) + Q^{-1} g(t))] \quad \text{EQ. 20}$$

$$E[z_t z_t^{trans}] = [H_{m,s}^{TRANS} R_{m,s}^{-1} H_{m,s} + Q^{-1}]^{-1} + E[z_t]E[z_t]^{Trans} \quad \text{EQ. 21}$$

where:

$$S_{m,s} = H_{m,s} Q H_{m,s}^{trans} + R_{m,s} \quad \text{EQ. 22}$$

$\omega_{m,s}$ is a mixture weight for state s and mixture m, o(t) is the observed training vector at time t, g(t) is the value of the expected trajectory at time t, $z_t$ is the value of the actual trajectory at time t, m is a mixture component, M is the number of mixture components associated with state s, the probability of each mixture component P(m) is uniform and equal to 1/M, "trans" represents the transpose of a matrix, and E[x] represents the expected value of x.

The calculations above complete the E-step in the EM algorithm.

The initial model parameters and the results from the E-step are then used to re-estimate the model parameters in the M-step. Specifically, the model parameters are calculated as:

$$\hat{H}_{m,s} = \left\{ \sum_{t=1}^{T} [\omega_{m,s}(t) \cdot (\hat{v}(t) \cdot E\{z_t\}^{Trans})] \right\} \cdot \left\{ \sum_{t=1}^{T} [\omega_{m,s}(t) \cdot E\{z_t \cdot z_t^{Trans}\}] \right\}^{-1}$$ EQ. 23

$$\hat{\bar{\mu}}_{m,s} = \frac{\sum_{t=1}^{T} \omega_{m,s}(t) \cdot o(t)}{\sum_{t=1}^{T} \omega_{m,s}(t)}$$ EQ. 24

$$\hat{\bar{z}}_{m,s} = \frac{\sum_{t=1}^{T} \omega_{m,s}(t) \cdot E\{z_t\}}{\sum_{t=1}^{T} \omega_{m,s}(t)}$$ EQ. 25

$$\hat{R}_{m,s} = \frac{\sum_{t=1}^{T} \begin{bmatrix} \omega_{m,s}(t) \frac{1}{T} \sum_{t} (o(t) - \\ (\bar{\mu}_{m,s} + H_{m,s}(g(t) - \bar{z}_{m,s})) \cdot \\ (o(t) - (\bar{\mu}_{m,s} + H_{m,s}(g(t) - \bar{z}_{m,s})))^{trans} \end{bmatrix}}{\sum_{t=1}^{T} \omega_{m,s}(t)}$$ EQ. 26

$$\hat{Q} = \frac{\sum_{t=1}^{T} (E\{z_t\} - g(t))(E\{z_t\} - g(t))^{trans}}{T}$$ EQ. 27 and $\hat{\gamma}_{u(t)}$ is determined using a gradient descent algorithm where $\gamma_{u(t)}$ is progressively updated until it changes less than a threshold amount between iterations. Specifically, $\hat{\gamma}_{u(t)}$ is updated using:

$$\hat{\gamma}_{u(t)}^{r+1} = \hat{\gamma}_{u(t)}^{r} + \varepsilon \frac{\partial \lfloor E\{z(t) - 2\gamma_{u(t)}g(t-1) - \gamma_{u(t)}^{2}g(t-2) + (1 - \gamma_{u(t)})^{2} T_{u(t)}\} \rfloor}{\partial \hat{\gamma}_{u(t)}^{r}}$$ EQ. 28

One aspect of the present invention is that the targets $T_{u(t)}$ for the possible speech units u are trained simultaneously instead of being trained individually. This is done because changing the target for one speech unit changes the value of g(t) for the next speech unit. The training is performed using the following matrix equation:

$$\hat{T} = \left[ \sum_{t=1}^{T} \sum_{m=1}^{M} \omega_{m,s}(t) \cdot E\{z_t\} \cdot (\hat{b}(t))_{u(t)} \right] \cdot \left[ \sum_{t=1}^{T} \sum_{m=1}^{M} \omega_{m,s}(t) \cdot \hat{b}(t) \cdot (\hat{b}(t))_{u(t)} \right]^{-1}$$ EQ. 29 where $$\hat{T} = (\hat{T}_1, \hat{T}_2, \ldots)$$ EQ. 30

$$\hat{b}(t) = 2\gamma_{u(t)} \hat{b}(t-1) - \gamma_{u(t)}^2 \hat{b}(t-2) + (1 - \gamma_{u(t)})^2 e_{u(t)}$$ Eq. 31

$$e_{u(t)} = (0,0,\ldots,1,\ldots,0,0)^{Trans} \text{ with 1 at position } u$$ EQ. 32 and $(\hat{b}(t))_{u(t)}$ is the single element of matrix $\hat{b}(t)$ that is associated with phonetic unit u(t).

The E-step and the M-step may be iterated a number of times to come to a final set of model parameters. Under one embodiment, after each iteration of the E-step and M-step, the sequence of training vectors O(t) is decoded using the current form of the Hidden Trajectory Hidden Markov Model. This decoding provides a new set of state boundaries that can be used in the next iteration of the EM algorithm. Once the final set of parameters has been determined, they can be used to decode an observed set of acoustic vectors.

The decoding task after training is complete involves finding a word sequence that most likely generated a sequence of acoustic observations. The decoding task during training involves finding the most likely time alignment of a sequence of acoustic observations for a given word sequence. Under one embodiment of the present invention, decoding is performed using a Finite-State Transducer that consists of a network of connected states. Each state in the network represents an HMM state and the connections between the states are based on a dictionary that defines a sequence of states for each word in the dictionary. Thus, every path through the state network represents a word in the dictionary. The network is closed on itself such that the ending states of each word connects to the beginning states of each word in the dictionary.

Figure 3:
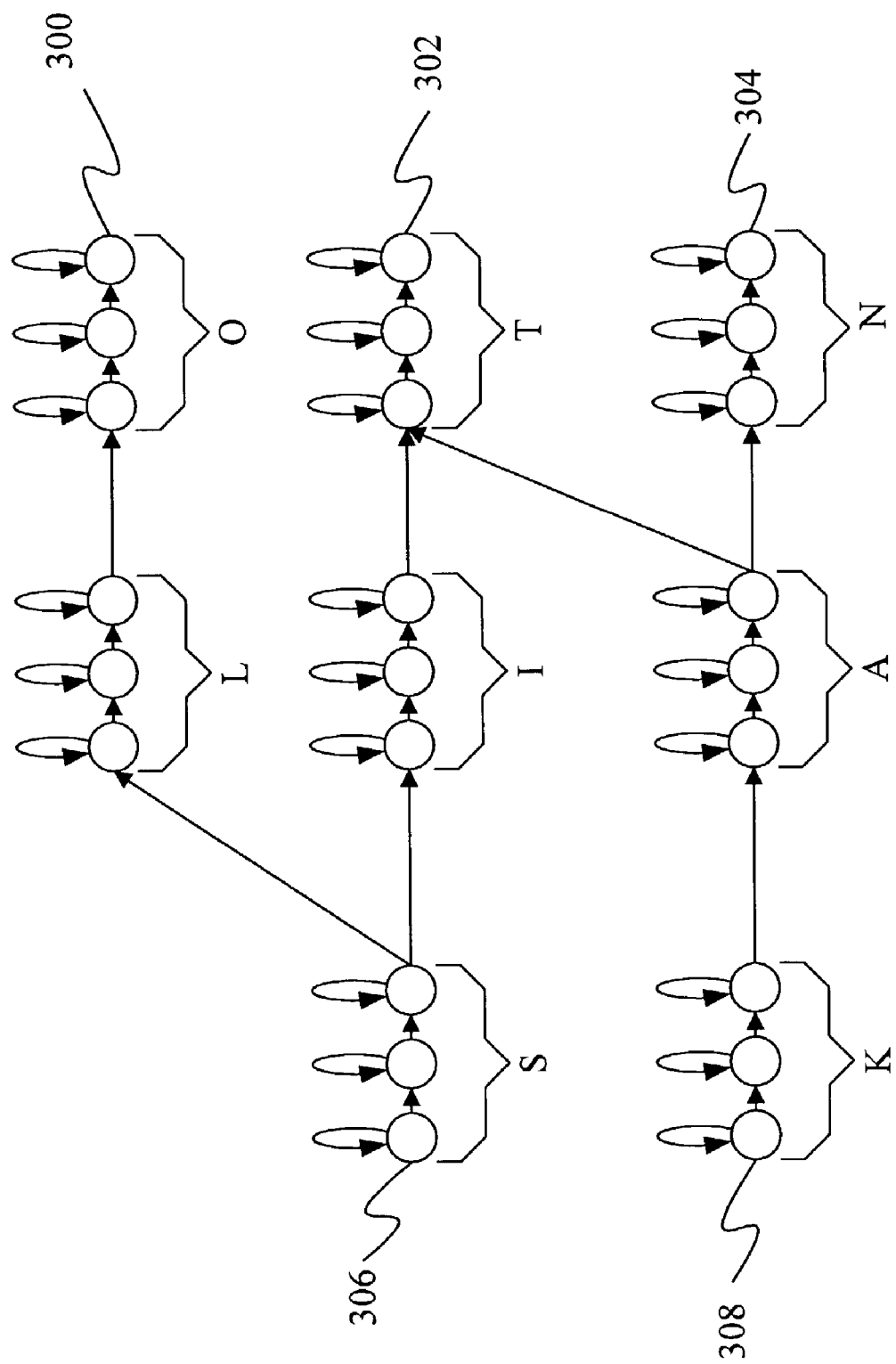
FIG. 3 is a simple finite state diagram.

A simple example state network is shown in FIG. 3. The state network of FIG. 3 represents four words: "slow", "sit", "cat", and "can." Although not shown, each ending state 300, 302, and 304 connects to each beginning state 306 and 308. Note that each state includes a self transition, such as transition 310.

Decoding involves finding the highest probability path through the network given the input feature vectors. For each input feature vector, a most-likely transition into each available state is selected based on the probability of the complete path up to and including the state. After all of the feature vectors have been processed, the path that ends at the end of a word in the highest probability is selected as the decoded word sequence.

Under one embodiment, the probability for a path is dependent on a number of separate probabilities including a language model probability that provides the probability of transitioning between language model states, h, along the path; HMM transition probabilities that indicate the likelihood of transitioning between states, s, along the path; and state probabilities that are dependent on the current value of the trajectory G at state s in time frame t.

Figure 4:
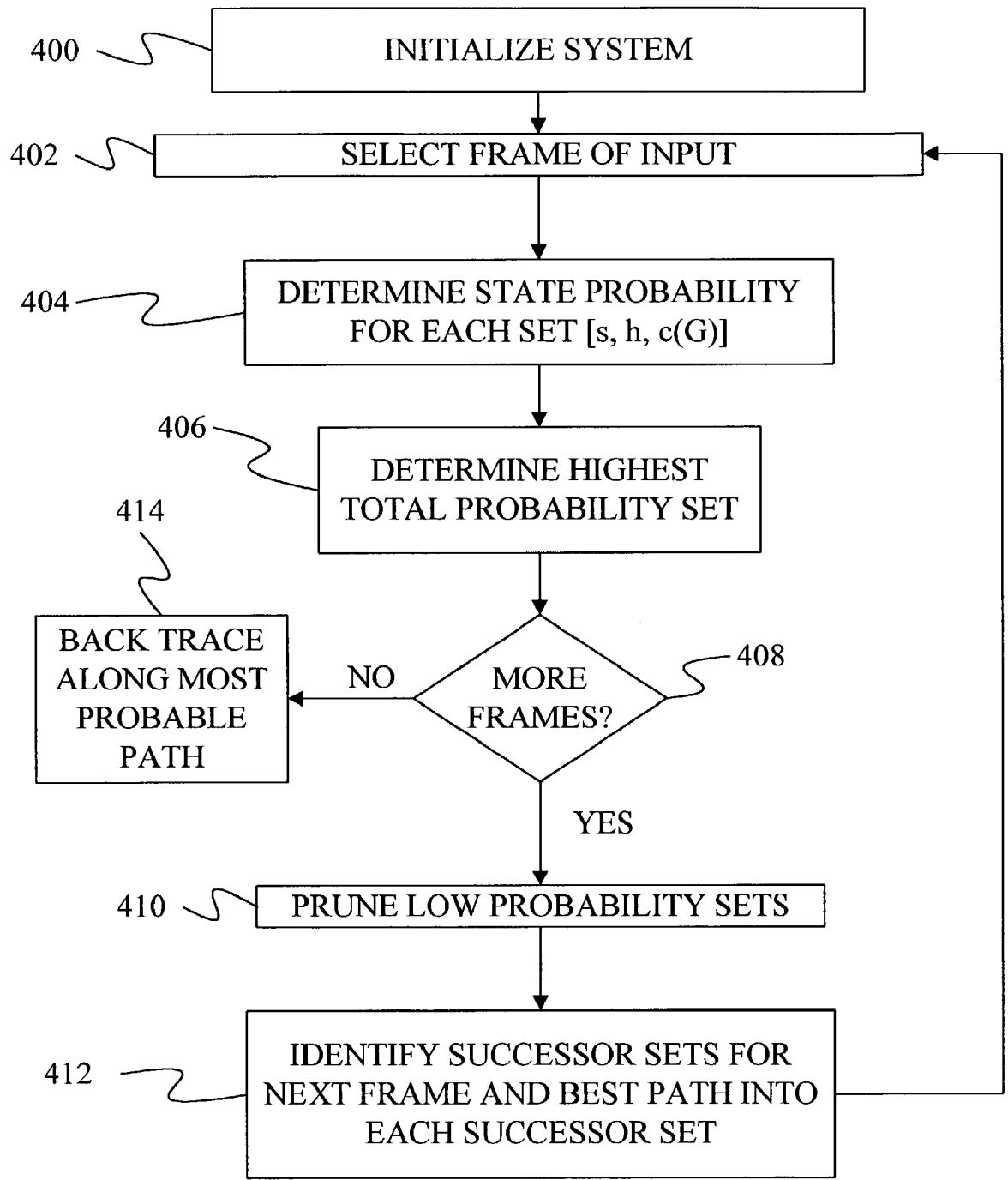
FIG. 4 is a flow diagram of a method of decoding under one embodiment of the present invention.

FIG. 4 provides a flow diagram of a method of decoding under the present invention. In step 400 the decoding system is initialized. This involves creating a single active path for a start state s=0, h=0 and G(0,-1)=target_relaxed,target_relaxed at time t=0, where "target_relaxed" represents a trajectory value associated with human articulators in a relaxed position.

At step 402, an input value from the input signal is selected. As discussed further below, this involves dividing the input signal into frames, converting each frame into a feature vector, such as Mel-Frequency Cepstrum Coefficients, and selecting one of the feature vectors for decoding at each time point t.

At step 404, a set of state probabilities are calculated using the selected feature vector. In particular, a separate state probability is calculated for each combination of HMM state s, language model state h, and class of trajectory c(G) that is active at time t. Under one embodiment of the invention, the continuous trajectory value G is assigned to one of $2^{24}$ possible classes. This is done to make the decoding feasible. If the classes were not used, a separate state score would have to be calculated for all possible values of G. Note that the class of the trajectory is only used to limit the search space and is not used in the probability calculation itself. For the probability calculation, the continuous value of G is used directly.

The state probability for an active [s,h,c(G)] set is calculated as:

$$p(o(t) \mid g(t), s) = \log \sum_{m=1}^{M} \omega_{m,s} N(o(t); \bar{\mu}_{m,s} + H_{m,s}(g(t) - z_{m,s}), R_{m,s}) \quad \text{Eq. 33}$$

which is similar to equation 13 above except that the calculated trajectory g(t) has been substituted for the actual trajectory z(t) and the probability is summed over all possible mixture components. Thus, the probability is determined by applying the observation feature vector o(t) to a normal distribution for each mixture component where each normal distribution has a mean that is essentially an HMM mean, $\bar{\mu}_{m,s}$, that has been dynamically adjusted based on a current value of a trajectory, g(t), at time t in state s. Note that the log of the probabilities is used to avoid numeric underflow.

Each state probability is combined with a path probability for the path leading to the state to form a total probability for each set [s,h,c(G)]. The highest total probability among all of the active sets is determined at step 406.

At step 408, the method determines if there are more frames of the input signal to process. If there are, the process continues at step 410, where those sets that are not within a threshold of the highest total probability are pruned.

For each set [s,h,c(G)] that is not pruned at state 410, a successor set [s',h',c'(G)] is identified at step 412. The dictionary is used to identify each possible successor state, s', and each possible language model state h' from the present state s and language model state h. The successor class of the trajectory is determined by first utilizing the successor state s' and the continuous value of the trajectory G(t) associated with the present set [s,h,c(G(t))] to determine the value of the trajectory G(t+1) in the successor state. In particular, the value of the trajectory G(t+1) is calculated as:

$$G(t+1) = \Phi_{u(t+1)} G(t) + V_{u(t+1)} \quad \text{Eq. 34}$$

where the parameters in matrices $\Phi_{u(t+1)}$ and $V_{u(t+1)}$ are selected based on the speech unit that the successor state S' is part of and G(t) is the current continuous value of trajectory G for set [s, h, c(G(t))].

The class of the continuous value G(t+1) is then determined to determine the successor class of the trajectory, c'(G), and thereby define the successor set [s',h',c'(G)].

The log probability of transitioning from the present set to the successor set is then added to the log probability for the best path ending at set [s,h,c(G)] to produce a probability for a path entering the successor set [s',h',c'(G)]. For within word transitions, the set transition probability is based only on the HMM transition probability of transitioning from state s to state s'. However, when a transition is between words, the probability of transitioning is the sum of the log probability of transitioning between states s and s' as provided by the HMM and the log probability of transitioning from state h to state h' as provided by a language model that describes the likelihood of particular sequences of words.

If this successor state has been previously created, the probability for this current path into the successor set is compared to the probability for the existing path into the set. If the probability of the current path is greater than the probability for the existing path, the existing path is replaced with the current path. However, if the probability of the existing path into the successor set [s',h',c'(G)] is greater than the current path, the existing path is maintained and the current path is deleted. Thus, at step 412, only the highest probability path into each possible successor set is maintained.

After step 412, a group of successor sets has been identified for the next frame of input and each successor set has only one path entering it. In addition, each successor set includes a back tracing data structure that allows the sequence of words or states represented by the path entering the successor state to be recovered. When decoding after training is complete, this data structure includes the last word identified along the path, a pointer to a previous data structure that was constructed for the word before the last word, and, optionally, the time point at which the last word ended. Thus, there is a chain of data structures, one for each word along the path, that can be traced back using the pointers in the data structures to recover the word sequence of the path and if desired the segmentation of the word sequence relative to the input frames. When decoding during training, this data structure includes the identities of states instead of words.

When there are no more frames to be processed at step 408, the system selects the highest probability path that ends at the end of a word as representing the input signal at step 414. The back pointer data structures for this path are then traced back to find the sequence of words or states represented by the path. This sequence of words or states is then used as the decoded output.

Figure 5:
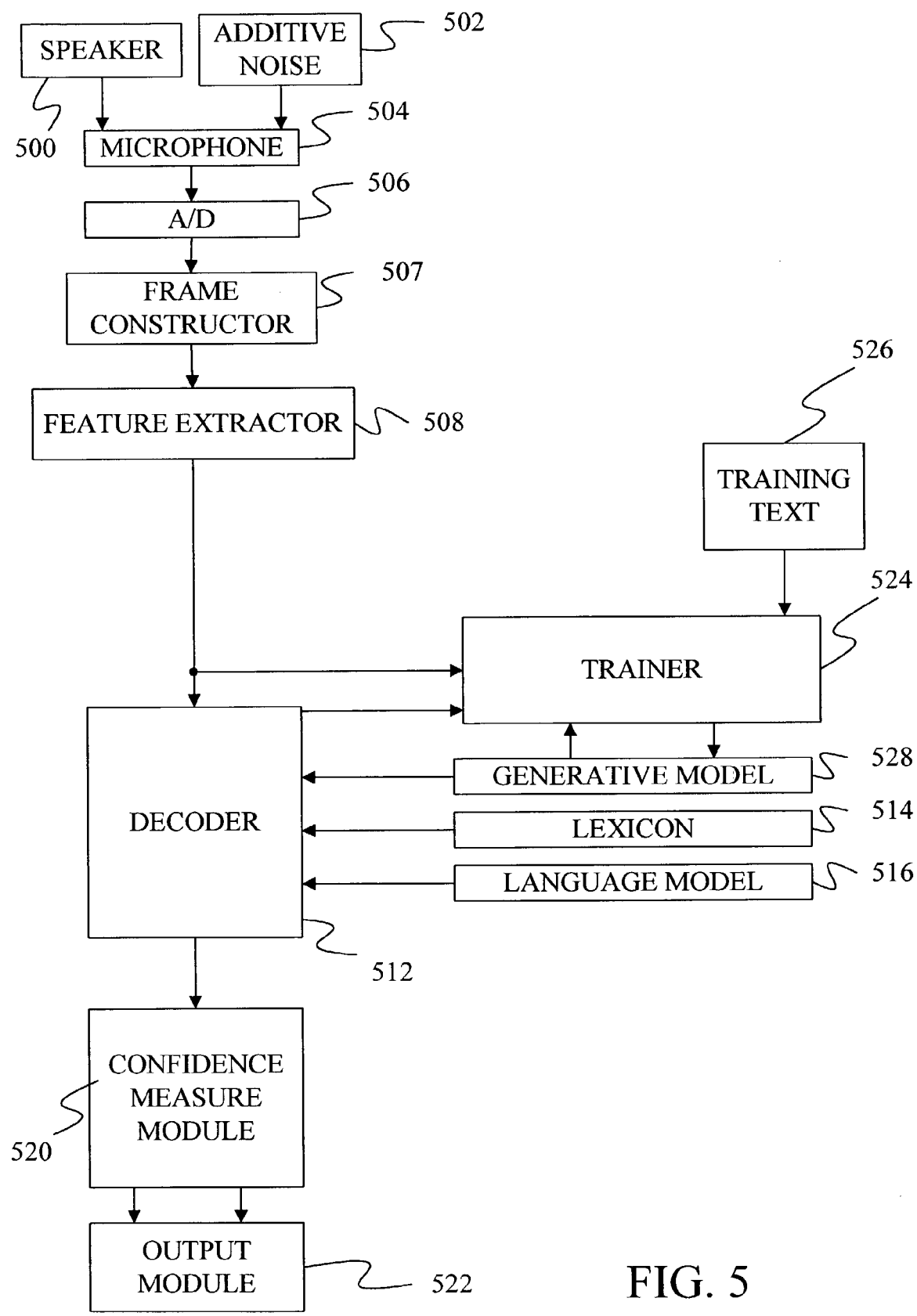
FIG. 5 is a block diagram of a speech recognition system under one embodiment of the present invention.

FIG. 5 provides a block diagram of a speech recognition system in which the present invention can be used. In FIG. 5, a speaker 500, either a trainer or a user, speaks into a microphone 504. Microphone 504 also receives additive noise from one or more noise sources 502. The audio signals detected by microphone 504 are converted into electrical signals that are provided to analog-to-digital converter 506.

A-to-D converter 506 converts the analog signal from microphone 504 into a series of digital values. In several embodiments, A-to-D converter 506 samples the analog signal at 16 kHz and 16 bits per sample, thereby creating 32 kilobytes of speech data per second. These digital values are provided to a frame constructor 507, which, in one embodiment, groups the values into 25 millisecond frames that start 10 milliseconds apart.

The frames of data created by frame constructor 507 are provided to feature extractor 508, which extracts a feature from each frame. Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that the invention is not limited to these feature extraction modules and that other modules may be used within the context of the present invention.

If the input signal is a training signal, this series of feature vectors is provided to a trainer 524, which uses the feature vectors and a training text 526 to train the generative model 528 of the present invention. For example, the EM training algorithm described above may be used to train the generative model.

As mentioned above, the EM training algorithm may be iterative. In such cases, after each iteration of the EM algorithm, the training feature vectors are applied to a decoder 512 to identify alignment boundaries between the frames of the training signal and the states in the generative model. These alignment boundaries are then provided to trainer 524 for the next iteration of training. During such training decoding, the state network is limited to the sequence of states defined in the training text 526. As such, lexicon 514 is not used during the training decoding.

Decoder 512 identifies a most likely sequence of words based on the stream of feature vectors, a lexicon 514 or training text 526, a language model 516, and the generative model 528. Under one embodiment, lexicon 514 defines the finite state network that is traversed by decoder 512 to identify a word from a sequence of feature vectors.

The most probable sequence of hypothesis words is provided to a confidence measure module 520. Confidence measure module 520 identifies which words are most likely to have been improperly identified by the speech recognizer, based in part on a secondary acoustic model (not shown). Confidence measure module 520 then provides the sequence of hypothesis words to an output module 522 along with identifiers indicating which words may have been improperly identified. Those skilled in the art will recognize that confidence measure module 520 is not necessary for the practice of the present invention.

Although the present invention has been described with reference to particular embodiments, workers skilled in the art will recognize that changes may be made in form and detail without departing from the spirit and scope of the invention.

What is claimed is:

1. A method of speech recognition, the method comprising:
dividing an input signal into frames;
calculating a vocal tract resonance trajectory value for a frame of an input signal and a decoding state based on vocal tract resonance trajectories determined for two immediately preceding frames and a target for the vocal tract resonance trajectory using a recursive definition;
using the vocal tract resonance trajectory for the state to determine a probability distribution for the state by determining a mean for the probability distribution by multiplying a difference between an expected value for the vocal tract resonance trajectory and the vocal tract resonance trajectory by a value associated with the state to form a product and adding the product to a second mean associated with the state and separate from the target;
determining a probability for an observation value associated with the frame based on the probability distribution for the state; and
using the probability for the observation value to produce a word represented by the frame.

2. The method of claim 1 wherein the target is associated with a speech unit that is formed in part by the state.

3. The method of claim 2 wherein the target is one of a plurality of targets, each target being associated with a separate speech unit.

4. The method of claim 3 wherein the plurality of targets are trained such that all of the targets are updated simultaneously.

5. The method of claim 1 further comprising using the probability to identify a sequence of words represented by a sequence of observation values.

6. The method of claim 1 further comprising using the probability to identify temporal boundaries of a sequence of phones in a training script.

7. The method of claim 1 wherein determining a vocal tract resonance trajectory comprises not including a noise term in the determination.

8. A computer-readable storage medium having computer-executable instructions for performing steps comprising:
dividing a speech signal into frames;
determining a first hidden vocal tract resonance trajectory for a first frame of the speech signal;
using the first hidden vocal tract resonance trajectory to determine a second hidden vocal tract resonance trajectory for a second frame of the speech signal, the second frame of the speech signal being the next frame after the first frame;
using the first and second hidden vocal tract resonance trajectories to determine a third hidden vocal tract resonance trajectory for a third frame of the speech signal without using a noise term, the third frame of the speech signal being the next frame after the second frame; and
using the first second and third hidden vocal tract resonance trajectories to identify at least one word in a sequence of words represented by the speech signal.

9. The computer-readable storage medium of claim 8 wherein determining a third vocal tract resonance trajectory further comprises using a target.

10. The computer-readable storage medium of claim 9 wherein the target is one of a plurality of targets, each target being associated with a different phonological unit.

11. The computer-readable storage medium of claim 10 wherein the plurality of targets are trained simultaneously.

12. The computer-readable storage medium of claim 8 wherein the steps further comprise using the third hidden vocal tract resonance trajectory to determine a probability distribution for a decoding state.

13. The computer-readable storage medium of claim 12 wherein the steps further comprise applying an observed value to the probability distribution for the state to determine a probability for the observed value given the state.

14. The computer-readable storage medium of claim 13 wherein the state comprises a Hidden Markov Model state.

15. The computer-readable storage medium of claim 13 wherein the steps further comprise decoding a sequence of observed values to determine a set of alignment boundaries between the observed values and a collection of states.

16. The computer-readable storage medium of claim 15 wherein decoding comprises identifying a path through a network of sets, each set comprising a state and a class of the vocal tract resonance trajectory.

17. The computer-readable storage medium of claim 16 wherein each set further comprises a language model state.

18. A computer-readable storage medium having computer-executable instructions that when executed by the processor cause the processor to perform steps comprising:
determining the value of a hidden vocal tract resonance trajectory for each frame of a set of frames of training data wherein for each frame, a hidden vocal tract resonance trajectory value for the frame further depends on a previously determined target for the hidden vocal tract resonance trajectory associated with the frame and hidden vocal tract resonance trajectory values for two frames of training data immediately preceding the frame wherein the hidden vocal tract resonance trajectory values of the two preceding frames are separate from the target and depend on respective different targets associated with the two preceding frames;

using the hidden vocal tract resonance trajectory values for the set of frames of training data to simultaneously set all targets in a plurality of targets for the hidden vocal tract resonance trajectory;

receiving an input speech signal; and using the plurality of targets to find a word sequence represented by the input speech signal.

19. The computer-readable storage medium of claim 18 wherein each target is associated with a different speech unit.

20. The computer-readable storage medium of claim 18 wherein the previously determined target is associated with a speech unit that is aligned with the frame.

21. The computer-readable storage medium of claim 20 wherein the speech unit is aligned with the frame by decoding frames of training data.

* * * * *